Feb. 12, 1957

C. J. SMITH 2,781,232

CAN DISPATCHING APPARATUS

Filed Jan. 5, 1953

INVENTOR.
Clarence J. Smith
BY
Moore, Olson & Trexler
attys.

Feb. 12, 1957 C. J. SMITH 2,781,232
CAN DISPATCHING APPARATUS
Filed Jan. 5, 1953 5 Sheets-Sheet 4

INVENTOR.
Clarence J. Smith
BY
Moore, Olson & Trexler
attys.

United States Patent Office 2,781,232
Patented Feb. 12, 1957

2,781,232

CAN DISPATCHING APPARATUS

Clarence J. Smith, Rockford, Ill., assignor, by mesne assignments, to W. F. and John Barnes Company, Rockford, Ill., a corporation of Illinois Application January 5, 1953, Serial No. 329,526

21 Claims. (Cl. 302—2)

The present invention relates to a novel apparatus for conveying or transferring articles from one point to another, and more particularly to a novel apparatus for pneumatically conveying or transferring cans or similarly shaped articles.

A serious problem confronting manufacturers of cans today is how to convey the cans from the manufacturing machinery to suitable points for storage or for shipping. Under present day practices, cans are manufactured at high speed, and in order to avoid the necessity for substantial storage space, the cans are usually conveyed to points from which they are immediately transferred into shipping containers or suitable railroad boxcars for bulk shipment. In the past, the placing of the cans in the shipping containers or the boxcars has generally been done by hand, which is relatively slow and requires a substantial amount of labor. Devices have been devised whereby a worker may pick up a plurality of cans at one time and deposit them in a container or a boxcar, but even with these devices, the number of workers and labor involved in packing the cans is excessive.

It is an object of the present invention to provide a novel apparatus for pneumatically conveying cans or similar articles from one point to another. The apparatus of this invention is especially useful for either packing or unpacking cans into and from containers or vehicles such as trucks or railroad boxcars at relatively high speeds.

Another object of the present invention is to provide a novel apparatus of the above described type which is constructed in a manner so that the cans are rolled substantially from one point to another.

A more specific object of this invention is to provide a novel apparatus of the above described type which includes an inlet conduit means, an outlet conduit means, an intermediate conduit means and a blower disposed in by-pass relation with the intermediate conduit means for drawing air through the inlet conduit and blowing air out through the outlet conduit, which apparatus is constructed and arranged to insure the passage of cans or the like through the intermediate conduit means.

Another object of the present invention is to provide a novel apparatus of the above described type, wherein the conduit means are constructed so as to insure a continuous passage of air therethrough, thereby preventing blocking by articles such as cans therein.

Still another object of the present invention is to provide a novel apparatus of the above described type with a novel flexible conduit construction so that conduits may be bent or moved to deliver cans or similar articles to any desired location.

Still another object of the present invention is to provide an apparatus of the above described type with a novel blower mechanism for efficiently drawing air through the inlet conduit and forcing air through the outlet conduit.

Still other objects and advantages of the present invention will become apparent from the following description and the accompanying drawings, wherein:

Referring more specifically to the drawings, wherein like parts are designated by the same numerals throughout the various figures, an apparatus embodying the principles of this invention is shown best in Figs. 1, 6, 7, and 8 and includes an inlet conduit member 20, an outlet conduit member 22, an intermediate conduit member 24, and a blower unit 26.

Figure 6:
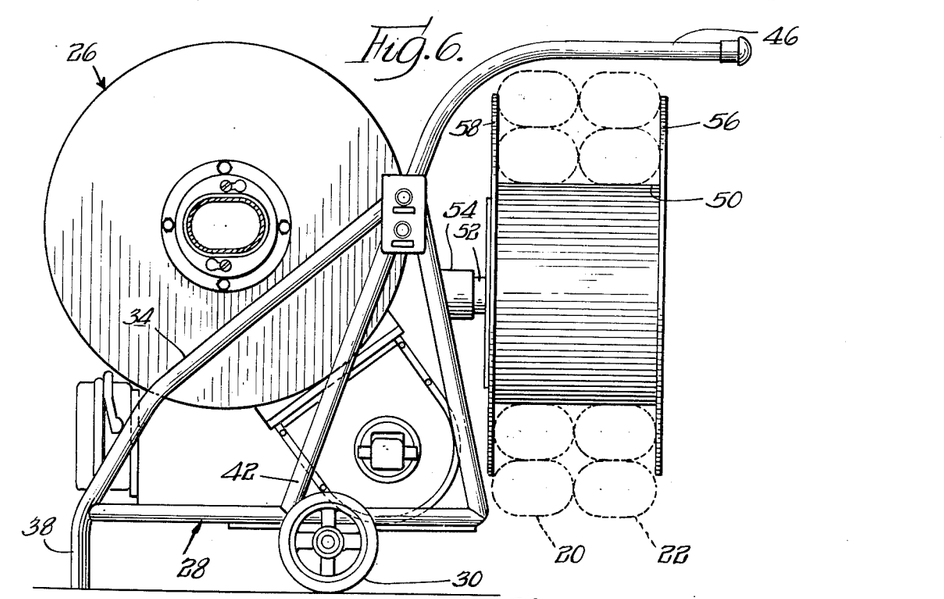
Fig. 6 is an enlarged end view of the apparatus shown in Fig. 1 and illustrating the manner in which the conduit means may be disconnected and stored.
Figure 7:
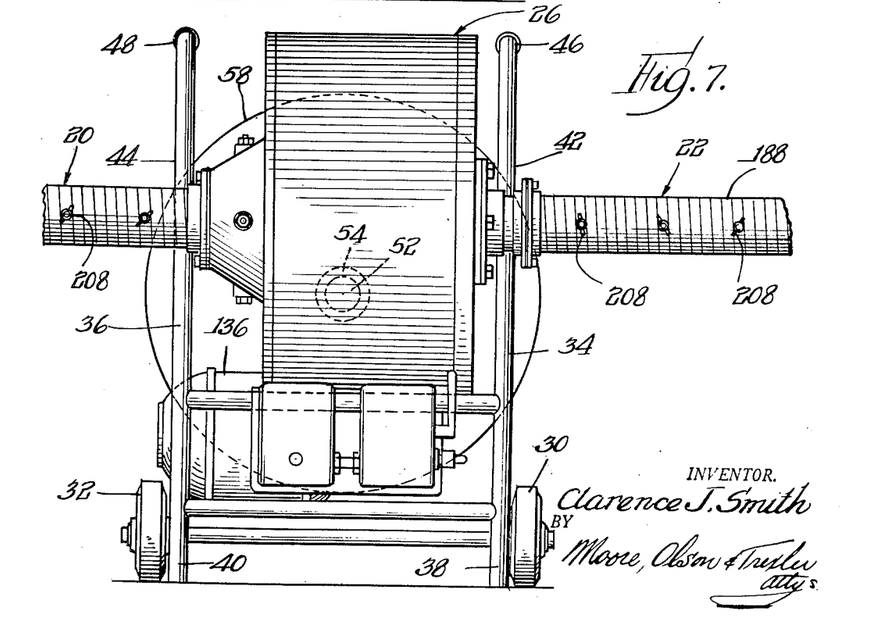
Fig. 7 is an enlarged fragmentary side elevational view similar to Fig. 1 showing the apparatus in greater detail.

As shown best in Figs. 6 and 7, the blower unit 26 is supported on a suitable frame 28 in any desired manner. Preferably, the frame is provided with a pair of wheels 30 and 32 so that the apparatus may be conveniently transported from one desired location to another. In order to hold the frame level, frame members 34 and 36 extend downwardly to provide support legs 38 and 40, respectively. Frame members 42 and 44, which extend generally upwardly, as shown in Fig. 6, preferably have their upper ends bent to provide handle portions 46 and 48, respectively, which handles may be grasped by an operator to tilt the frame so as to lift the support legs from the floor so that the unit may be conveniently transported.

In order to provide convenient means for storing the flexible conduit members 20 and 22 when the apparatus is not in use, a drum 50 is provided, as shown in Figs. 6 and 7, and is mounted on an axle 52. The axle 52 is in turn supported substantially horizontally by a sleeve 54, which sleeve may be mounted to the back of the frame 28 in any suitable manner. The drum 50 is preferably provided with flanges 56 and 58 at its opposite ends to retain the conduit members thereon.

Figures 8, 9:
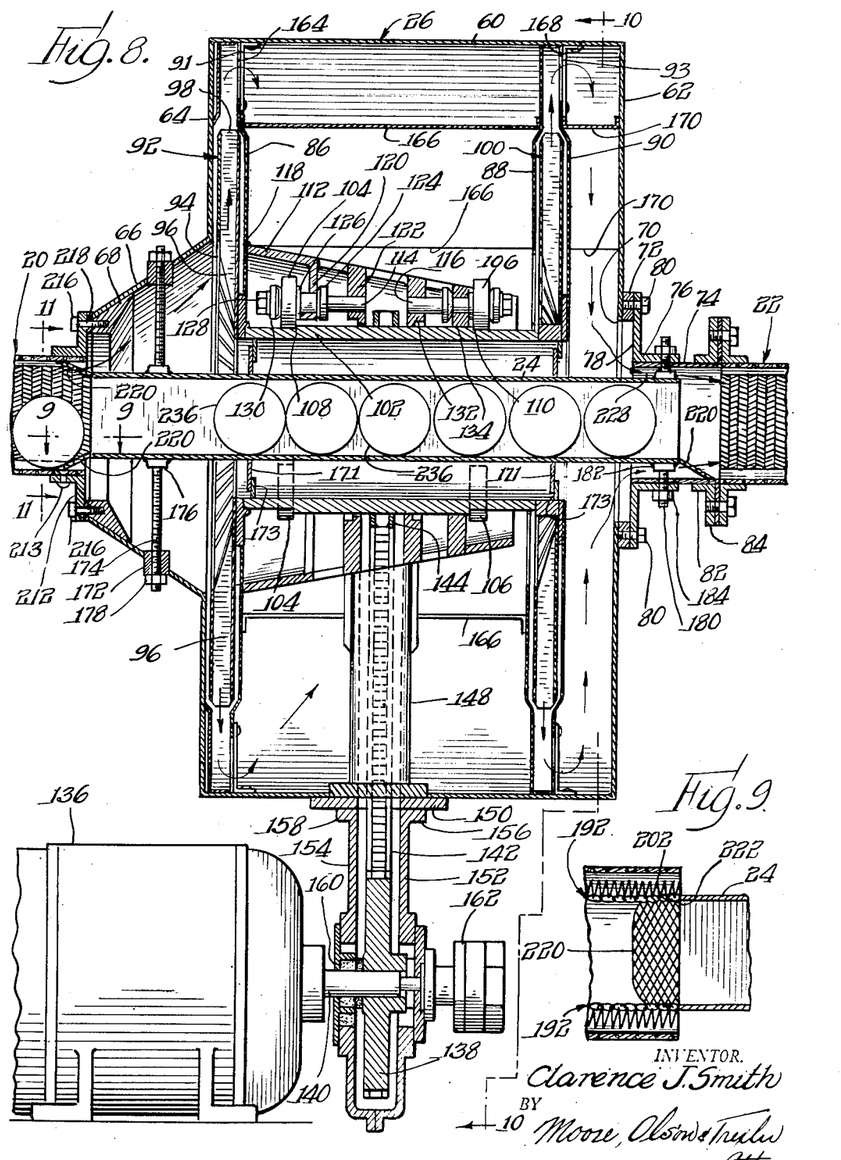
Fig. 8 is an enlarged cross sectional view taken along line 8—8 in Fig. 10.
Fig. 9 is an enlarged fragmentary horizontal cross sectional view taken along line 9—9 in Fig. 8 to show a portion of the apparatus in greater detail.
Figures 10, 11:
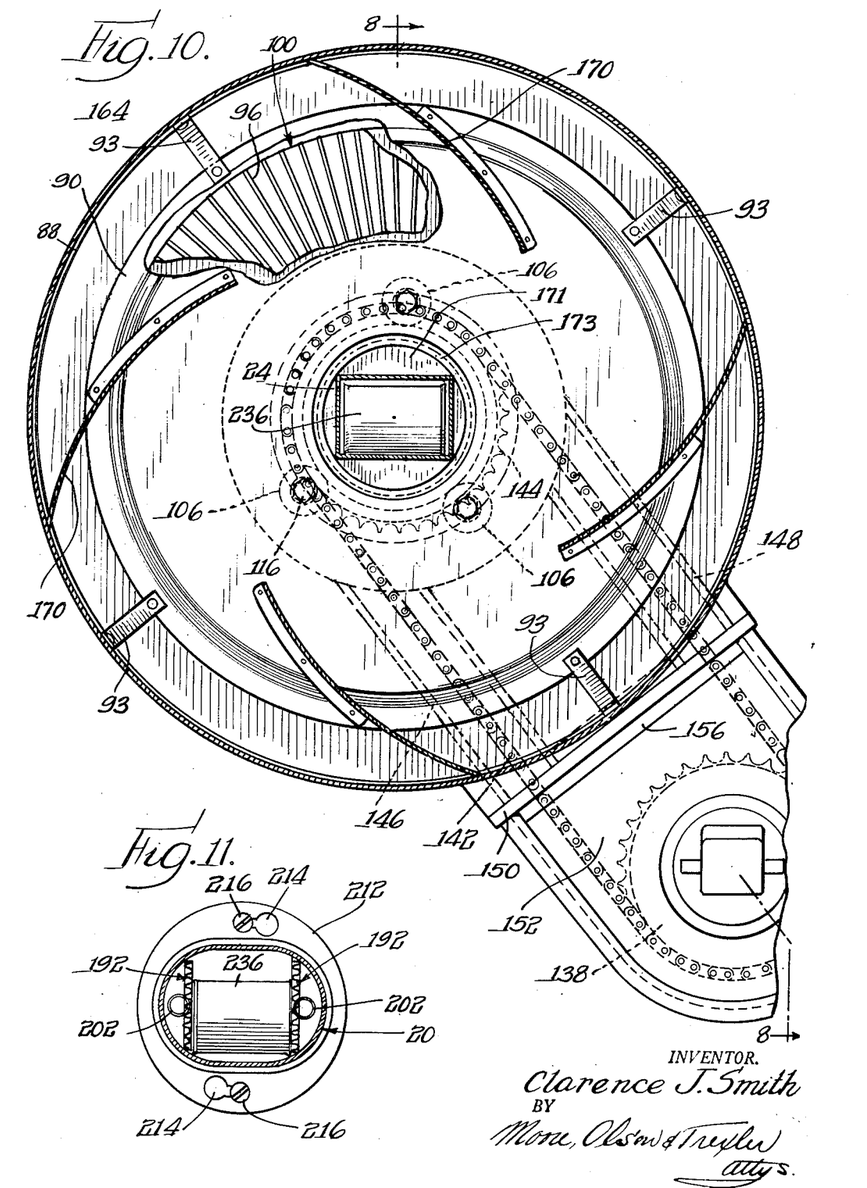
Fig. 10 is a cross sectional view taken along line 10—10 in Fig. 8.
Fig. 11 is a fragmentary cross sectional view taken along line 11—11 in Fig. 8.

Referring particularly to Figs. 8 and 10, the blower unit 26 includes a housing having a tubular wall 60 and end walls 62 and 64. The end walls are preferably welded or otherwise connected to the tubular wall 60 to provide an airtight housing. The end wall 64 includes a central frusto-conical portion 66 which is open at its outer end to provide an inlet for connection with the inlet conduit means 20. The frusto-conical portion 66, which is preferably constructed of sheet metal is reinforced at its outer end by an insert 68 to provide a firm and rigid base for connecting the end of the inlet conduit means 20 in the manner described fully hereinbelow.

The end wall 62 of the housing is provided with a centrally located outlet opening 70 surrounded by a reinforcing ring 72, which may be welded or otherwise secured to the wall. In order to connect the outlet or dispensing conduit 22 to the housing, an adapter is provided which includes a tubular section 74 having substantially the same internal size and shape as the conduit means 22. The section 74 is connected with a sleeve 76, as by welding or any other suitable means, which sleeve includes an annular flange 78 having an outer diameter preferably substantially equal to the outer diameter of the reinforcing ring 72 on the housing wall 62. The flange 78 is connected with the reinforcing ring 72 by any suitable means, such as screws 80, thereby to secure the adapter to the housing. A second sleeve 82 having a radially extending flange 84 is secured to the outer end of the tube or conduit section 74 to provide means for securing the outlet conduit member 22 in the manner described hereinbelow.

The blower housing is preferably divided into a plurality of axially spaced compartments by means of partitions 86, 88, and 90 (see Fig. 8). It should be noted that the partitions 86 and 90 are spaced from the outer wall of the housing and supported by a plurality of brackets 91 and 93, respectively. The partition 86 is disposed adjacent the inlet end of the housing to provide a relatively short compartment in which a centrifugal impeller 92 is adapted to rotate. The impeller 92 may be any well known type, but preferably is of the type having a central inlet opening 94 and radially extending blades 96 so that air is drawn in through the inlet and forced radially outwardly from the periphery of the impeller, as at 98. As shown in Fig. 8, the partitions 88 and 90 provide another relatively short or narrow compartment adjacent to, but spaced from, the end wall 62 of the housing, in which compartment a second centrifugal impeller 100 is adapted to rotate. The impeller 100 is preferably substantially identical to the previously described impeller 92.

The impellers 92 and 100 are fixed to the opposite ends of a centrally located rotatably axle or sleeve 102 for rotation therewith. Any suitable means may be provided for mounting the impellers to the axle. The axle or sleeve is rotatably supported adjacent its opposite ends by a plurality of rollers 104 and 106. As shown best in Fig. 10, these rollers are spaced apart about the periphery of the sleeve to suspend the axle or sleeve freely therebetween. It should be noted that the sleeve or axle is provided with radially extending annular shoulders 108 and 110 for engaging radially extending side walls of the rollers 104 and 106, respectively, to prevent axial displacement of the axle or sleeve and the impellers carried thereby.

The bearing rollers 104 and 106 are supported on a conical housing or support member 112 by means of axles 114 and 116, respectively. It should be noted that the larger end of the conical support member is adjacent the partition 86 and is preferably welded thereto, as at 118, whereby the conical member is supported by the partition. Each axle 114 is journaled within radially extending annular flanges 120 and 122, as shown in Fig. 8. A collar 124 is fixed on the axle 114 for engagement with one side of the flange 120 to prevent axial displacement of the axle and roller in one direction. A spacer 126 is provided on the axle between the roller and the flange 120 for limiting axial movement of the axle in the opposite direction. The roller 104 is retained on the axle by any suitable nut 128 and lock washer assembly 130. Each axle 116 for the rollers 106 is journaled within radially extending annular flanges 132 and 134 of the bearing support member or housing 112. The axle 116 is provided with substantially the same means for preventing axial movement and for retaining the rollers thereon as the axle 114, and, therefore, these means need not be described in detail. It should be noted that the small end of the conical support member is positioned so as to permit the passage of air to the inlet of the impeller 100.

In order to drive the impellers, a suitable electric motor 136 is mounted on the frame of the apparatus, as shown in Figs. 7 and 8. Referring particularly to Fig. 8, it is seen that a sprocket wheel 138 is mounted on the end of the motor shaft 140. A suitable endless chain 142 passes over the sprocket wheel 138 and into the blower housing end over an annular sprocket ring 144 welded or otherwise secured to the mid portion of the axle or sleeve 102. Preferably, a housing or guard having legs 146 and 148 surrounding the opposite runs of the chain 142 is provided within the blower housing for guarding the chain. As shown in Figs. 8 and 10, the chain guard is mounted to a base plate 150 by any suitable means, which base plate is secured to the wall 60 of the blower housing. The opposite ends of the legs 146 and 148 are preferably secured to the bearing support member 112 to provide additional support for the member.

In order to prevent air from entering the blower housing through the openings provided for the drive chain 142, a housing having sides 152 and 154 sealed together in airtight relationship is provided for surrounding the sprocket wheel 138 on the motor shaft and the portion of the chain extending out of the blower housing. The housing wall sides 152 and 154 have upper flanges 156 and 158, respectively, which may be joined with the base plate 150 in any suitable manner to provide an air tight seal. A suitable airtight packing 160 is provided surrounding the motor axle at one side of the sprocket wheel 138, and the opening in the opposite side 152 surrounding the motor axle is closed by the housing 162 of a standard lubricating gear pump.

From the above description, it is seen that when the motor 136 is energized, the centrifugal impellers 92 and 100 are driven so that air is drawn through the inlet of the blower housing by the impeller 92 and forced to the periphery of the blower housing under pressure from where it passes through an opening 164 around the periphery of the partition 86 into the housing compartment between partitions 86 and 88. A swirling action is imparted to the air by the impeller 92 which tends to cause the air to remain at the outer portions of the blower housing. In order to direct the air toward the interior of the housing for entry into the inlet of the impeller 100, a plurality of baffles 166 are disposed within the housing between the partitions 86 and 88. As shown best in Fig. 10, these baffles 166 are curved to direct the air from the outer portions of the blower housing toward the interior of the housing. Thus, air under pressure from the impeller 92 enters the inlet of the impeller 100, which impeller further increases the air pressure and throws the air toward the periphery of the blower housing between the partitions 88 and 90. Another annular opening 168 is provided about the periphery of the partition 90 through which opening air passes from the impeller 100 into the compartment between the partition 90 and the side wall 62 of the blower housing. A plurality of baffles 170, which are substantially identical to the baffles 166, are arranged in the last mentioned compartment for directing air under pressure from the outer portions of the blower housing toward the centrally located housing outlet. It is, thus, seen that the blower unit of the apparatus of this invention provides continuous air duct means for conveying air from the inlet of the blower housing through two impellers arranged in staged relation and to the outlet of the housing. It should be noted that in order to increase the efficiency of the impellers, the passage of air through the hollow axle or sleeve 102 is prevented by baffles 171 mounted on the intermediate tube or conduit section 24 in any suitable manner and cooperative sealing rings 173 secured to the inner surface of the axle or sleeve 102.

The above mentioned intermediate can or article conduit means 24 is preferably a rigid rectangular metal tube having interior cross sectional dimensions generally conforming to, but slightly larger than, the cans or other articles 236 so that the cans may roll therethrough. As shown best in Fig. 8, the tube or conduit means 24 is arranged centrally within the hollow axle or sleeve 102 of the blower unit and extends from substantially the inlet of the blower housing to the outlet of the housing. In order to support the tube or conduit means 24, the conical portion 66 of the blower housing is provided with a plurality of apertured radially extending sleeves 172 welded or otherwise secured therein, as shown in Fig. 8. Preferably, four of these sleeves 172 are provided, each with its aperture extending substantially normally to one side of the generally rectangular tube or conduit means 24. An elongated threaded rod 174 passes through each sleeve 172 and has its inner end threaded into a nut or boss 176 welded to the wall of the tube or conduit means 24. A nut 178 is threaded onto the outer end of the rod 174. Thus, by tightening the nut 178 on each of the rods, the length of the rod extending into the blower housing may be adjusted so that the tube or conduit means 24 may be accurately positioned centrally within the blower. The opposite end of the tube or conduit means 24 is similarly supported by means of threaded rods 180 extending through apertures in the sleeve 76 and tube section 74, which rods may be threaded into bosses 182 secured to the conduit means and adjusted by nuts 184. With the above structure, it is seen that the tube or conduit means 24 may be adjusted to any desired position and, furthermore, that the tube may be easily replaced with other tubes of different sizes for handling cans or articles of various sizes merely by adjusting the rods 174 and 180. If necessary, the adapter at the outlet end of the blower housing unit could easily be replaced with an adapter having a conduit section 74 of different dimensions to accommodate the different sizes of tubes 24.

The construction of the flexible inlet conduit 20 and of the outlet or dispensing conduit 22 is substantially identical and is shown best in Figs. 11, 12, 13, and 14. The flexible conduit means comprises an outer tube including a helically wound wire frame 186 sandwiched between outer and inner layers 188 and 190 of flexible fabric, such as rubberized cloth or any other fabric which is impervious to air. As shown best in Fig. 11, the tube is preferably somewhat flattened and is adapted to receive a can with the axis of the can extending transversely of the tube. Furthermore, it should be noted that the height of the tube is greater than the diameter of the can so that air may by-pass over the can so that the air may move through the tube faster than the cans, whereby the cans are rolled through the tube by frictional contact with the air as well as by the air pressure, and the cans cannot block the tube.

In order to maintain the cans in the proper position within the conduit means, flexible guide or track elements 192 are arranged longitudinally within the tubes, and preferably along opposite sides of the tubes for engagement with opposite ends of the cans. As shown best in Figs. 13 and 14, the guide or track elements 192 include a plurality of oval wire coils 194 which are arranged transversely to the length of the guide or track means. The coils 194 are disposed so that the loops of adjacent coils overlap and are interlocked by a wire 196 passing therethrough. The wire 196 is preferably secured to the opposite ends of one of the adjacent coils as by welding at 198 and 200. It is, thus, seen that the wire 196 prevents the coils from being pulled apart, but at the same time permits the coils to telescope or collapse together so that the relatively broad track-like elements may be bent or flexed with the flexible tube so that an operator may position the end of the tube at any desired location.

Figures 12, 13:
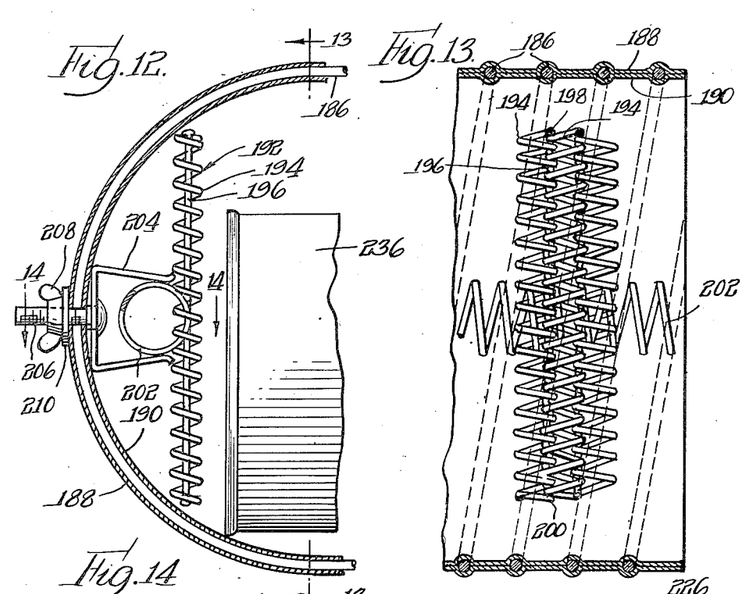
Fig. 12 is an enlarged fragmentary transverse cross sectional view of the flexible conduit means of the apparatus of this invention and showing the structure of such conduit means in greater detail.
Fig. 13 is a fragmentary cross sectional view taken along line 13—13 in Fig. 12.
Figures 14, 17:
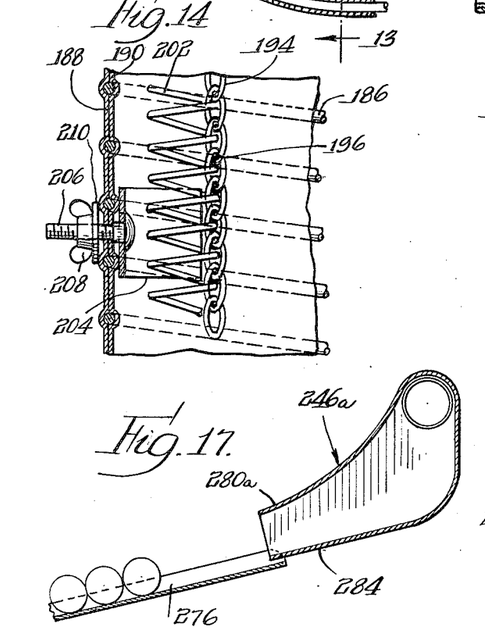
Fig. 14 is a fragmentary horizontal cross sectional view taken along line 14—14 in Fig. 12.
Fig. 17 is a fragmentary transverse cross sectional view showing another form of a discharge head or nozzle.

In order to support the guide or track elements 192 within the flexible tube, an elongated helical spring 202 is positioned along the outer side of each track or guide element, and, as shown best in Figs. 12 and 14, has its loops threaded through the loops of the coils 194 of the track element. A generally U-shaped spring clip 204 is positioned over the helical spring 202 in the manner shown in Figs. 12 and 14. A bolt 206 is assembled through an aperture in the base of the U-shaped clip and through an aperture in the side of the flexible tube for securing the clip to the flexible tube. Any suitable means for securing the outer end of the bolt 206, such as the nut 208 and washer 210, may be provided. If desired, the bolt and nut assembly as shown could be replaced with a suitable rivet construction. It is, of course, understood that the clip 204 holds the spiral or helical spring in a desired position, which spring in turn holds the guide or track element 192. In addition, it will be understood that a number of these holding clip assemblies are to be spaced along the flexible tube for insuring proper location of the guide tracks along the entire length of the tube. It should be further noted that the lead of the helical spring 202 is substantially equal to the width of the relatively flat loops of the coils 194 so that with adjacent loops of the helical spring threaded through loops of adjacent coils 194, the helical spring not only holds the guide or track element in position, but also yieldably urges the coils of the guide elements away from each other so that the guide element is normally yieldably extended longitudinally to its fullest extent. This action prevents kinking of adjacent coils of the guide element, which kinking might block the passage of cans or articles through the tube. As shown best in Fig. 12, the track element 192 is spaced from the end or side of the conduit tube to provide a passageway which cannot possibly be blocked by cans or articles passing through the tube so that a continuous flow of air through the tube is assured. Furthermore, the construction of the guide or track provides a screen-like element which is pervious to air so that air may pass between the central portion of the tube and the above mentioned passageway at any point along the entire length of the tube.

As shown in Figs. 8 and 11, a flange 212 is secured to the inlet conduit means 20 by any suitable means, such as rivets 213. The flange 212 is provided with key slots 214 which are adapted to receive headed pins 216 threaded or otherwise secured in the insert 68 within the conical portion 66 of the blower housing. Thus, the conduit means 20 may be easily and quickly attached to the blower housing merely by passing the enlarged portions of the key slots over the heads of the pins 216 and twisting the flange 212 so that the shanks of the pins enter the narrow portions of the key slots. Preferably, a suitable gasket 218 is provided between the flange 212 and the end of the blower housing to provide airtight seal. The outlet or dispensing conduit member is connected to the adapter at the outlet end of the blower housing in substantially the same way as the conduit means 20 is connected.

As shown best in Fig. 8, the dimensions of the flexible conduit are substantially greater than those of rigid intermediate conduit 24. Therefore, inclined members 220 are welded to the upper and lower edges of the inlet end of the rigid conduit 24 and to the lower edge of the outlet end thereof, and are adapted to extend toward the flexible conduit means to guide the cans into and from the intermediate tube or conduit means 24. The bottom inclined member 220 at the juncture between the inlet conduit means and the intermediate conduit means is illustrated best in Fig. 9, and it will be understood that the other inclined members 220 are constructed and arranged in substantially the same manner, except that the inclined member 220 provided at the outlet end of the tube 24 terminates within the conduit section 74 of the adapter instead of extending into the flexible tube. The inclined members 220 are provided with a plurality of apertures to permit the free passage of air between the conduit means and the blower housing, and they are preferably constructed of metal, which has been slit and stretched and is generally known as expanded metal. However, it is understood that any suitable material sufficiently porous to air may be utilized.

Figures 15, 16:
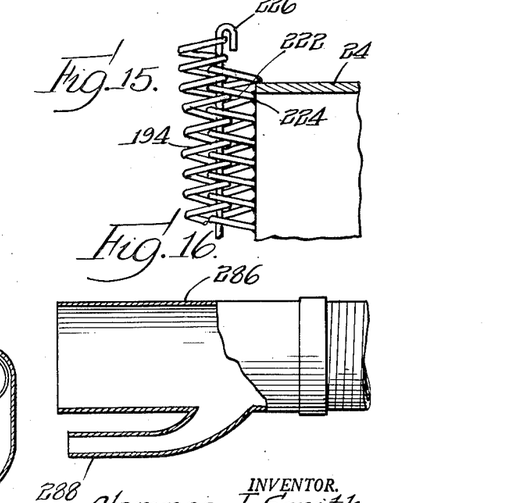
Fig. 15 is an enlarged cross sectional view showing the details of the connection between the flexible conduit means and the intermediate conduit means of the apparatus of this invention.
Fig. 16 is a fragmentary side view of one form of a discharge head or nozzle.

In order to provide a continuous track for the engagement of the ends of the cans, the track or guide elements 192 are preferably connected directly with the ends of the side or track walls of the rigid intermediate conduit tube 24. It should be noted that the guide or track elements 192 are spaced apart substantially the same amount as the side walls of the tube 24, and, thus, the ends of the elements 192 and the side walls of the tube 24 meet in abutting relationship. The connection between the elements 192 and the side walls of the tube 24 is shown best in Figs. 9 and 15 and includes a wire coil 222 which is substantially identical to the above described wire coils 194 of the track elements. The coil 222 is welded to the end of the conduit tube 24, as at 224. The loops of the coil 222 are positioned so that the loops of the end coil 194 of the guide or track elements may be positioned therebetween so that a locking pin 226 having a hooked upper end, as shown in Fig. 15, may be inserted through the coils to lock the same together. When making this connection, it has been found that because of the novel construction of the conduit means, the ends of the flexible outer tube and the guide or track elements may be axially displaced so that the guide element extends beyond the tube a sufficient amount to provide ready access for connecting the guide to the coil 222 in the manner described. It is, of course, understood that the guide or track elements of the outlet or dispensing conduit means 22 may be connected with the outlet end of the tube 24 in the same manner.

Referring particularly to Fig. 8, it should be noted that the outlet end of the intermediate tube 24 extends within the adapter conduit section 74 so that a restricted passageway 228 is provided between the adapter conduit section and the tube 24. In addition, it is noted that the adapter conduit section 74 has the same internal dimensions as the outlet or delivery conduit 22. Thus, the velocity of the air passing from the housing chamber between the partition 90 and the end wall 62 is substantially increased as it passes through the restricted passageway 228 so that a Venturi action is obtained at the outlet of the intermediate tube 24 for drawing cans from the intermediate tube. Thus, it is seen that the novel construction of this invention in effect provides a Venturi at the outlet end of the intermediate tube which insures the passage of cans or other like articles through the intermediate tube.

Figure 1:
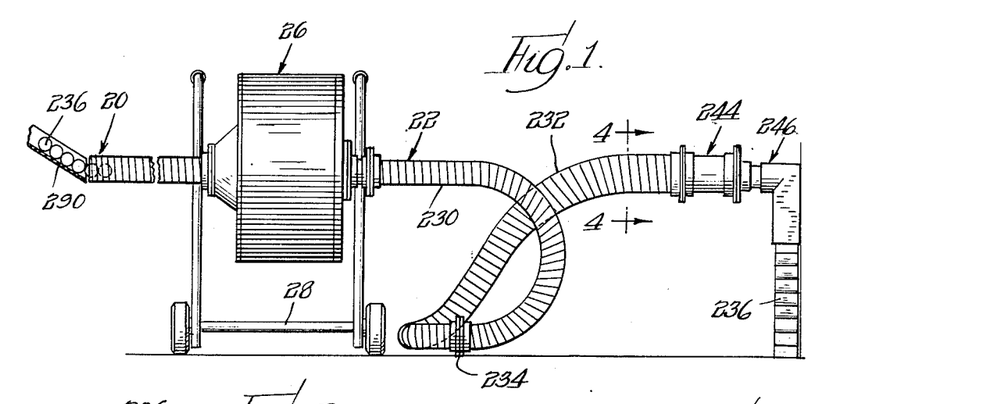
Fig. 1 is a side elevational view illustrating the novel apparatus of this invention being used for transferring cans from one point and stacking cans at another point either for storage or bulk shipment.
Figures 4, 5:
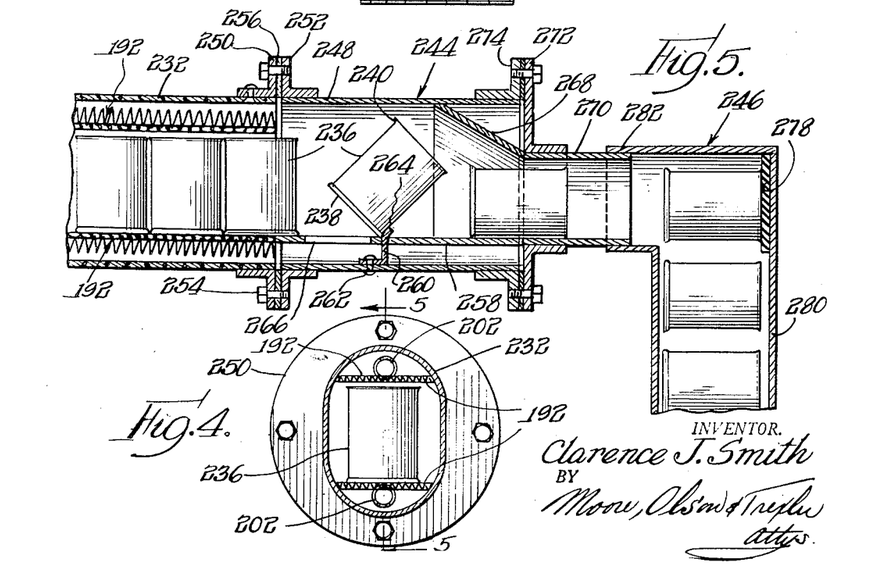
Fig. 4 is a fragmentary vertical cross section taken along line 4—4 in Fig. 1.
Fig. 5 is a fragmentary vertical cross section taken along line 5—5 in Fig. 4.

Referring to Figs. 1, 4, and 5, it is seen that the outlet or delivery tube is preferably divided into two sections 230 and 232. The first section 230, which is connected to the blower housing receives the cans or similar articles with their axes disposed substantially horizontally. The section 232, which may be connected to the section 230 by any suitable means, as at 234, is preferably twisted or spiraled so that the guide track elements 192 therein are spiraled, whereby the cans are turned through an angle of about 90° so that their axes are disposed substantially vertically. As shown in Figs. 4 and 5, when the apparatus of this invention is used to transfer cans 236 having one end 238 applied thereto and having the opposite end open, the cans are preferably introduced into the apparatus so that as they are twisted or turned in the section 232, the open ends are at the top. This is because such cans are usually provided with relatively delicate peripheral flanges 240 at their open ends which might be damaged if the cans were turned so that they slide on this flange.

Figure 3:
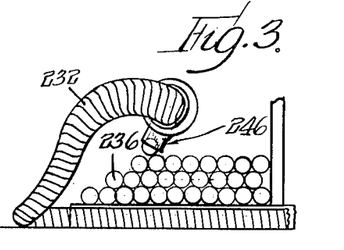
Fig. 3 is a fragmentary view illustrating the manner in which cans may be delivered from the outlet or dispensing conduit means for stacking.

At the outer end of the conduit section 232, there is provided a turning chamber 244 for turning the cans so that they are moved axially for movement into a discharge nozzle or head 246. The turning chamber 244 includes a tube section 248 having dimensions substantially equal to the dimensions of the conduit section 232. The two sections may be connected together by any suitable manner, such as by providing flanges 250 and 252 which may be bolted together by bolts 254 or connected together with any suitable bayonet connection. Preferably, a suitable gasket 256 is provided to insure an airtight joint. The turning chamber is provided with a guide or support plate 258 which is substantially in alignment with the lower guide track 192 of the conduit means 232. A baffle 260 is connected to the wall of the conduit section 248 by any suitable means, such as a rivet 262. The baffle 260 extends between the guide plate 258 and the wall of the section 248 to block off the flow of air. In addition, the baffle 260 extends above the guide plate 258, as at 264, to provide an abutment engageable with the lower edge of the can to cause the can to tip as illustrated. Preferably, the guide plate 258 is provided with apertures 266 forwardly of the baffle 260 to direct air against the bottom of a tilting can to assist in the tilting action. It will be noted that the upper portion of the tilting chamber is without guide means so as to provide an enlargement opposite the abutment member 264 to permit the above described tilting action of the can. A somewhat conical or funnel-shaped baffle or guide 268 is mounted within the tilting chamber to guide a tilted can axially into an outlet conduit section 270. The conduit section 270, which is circular in cross section, preferably has a diameter somewhat greater than the diameter of the cans so as to insure a continuous flow of air therethrough. The conduit section 270 may be connected with the conduit section 248 in any suitable manner, such as by a flange 272 welded or otherwise secured to the section 270, which flange is bolted to a flange 274 secured to the section 248. The discharge head on the end of the conduit section 270 may be in the form of the head 246 illustrated in Figs. 1, 3, and 5 for stacking cans as illustrated in Fig. 3, or it may be in the form of the head 246a illustrated in Fig. 17 for discharging cans onto a chute 276. In each instance, the head is formed with an abutment 278 (see Fig. 5) axially spaced from the end of the conduit section 270 a distance somewhat greater than the length of a can and forming one wall of a chute 280 which opens downwardly and transversely of the axis of the conduit section 270 and is shaped to release the cans in the desired position. Thus, the head may comprise an open sided casing slightly wider than the length of a can and having a flange 282 fitting over or swivelled on the end of the conduit section 270. In the embodiment shown in Figs. 1, 3, and 5, the head is provided with an open bottom for discharging the cans, as shown in Fig. 3, and in the embodiment shown in Fig. 17, the discharge head has an opening at one side thereof and a bottom 284 adapted to be positioned over the end of the downwardly inclined chute or track 276. Preferably, the abutment 278 is formed of yieldable material, such as rubber, to cushion the impact of the can against the abutment and thereby prevent injury to the relatively delicate open end of the can.

With discharge heads as described above, each can discharged under pressure from the conduit section 270 will come against the abutment 278. The can with the assistance of gravity is blown laterally into and out through the chute 280 and moves out of the opening therein either onto the inclined track 276, as shown in Fig. 17, or onto a previously deposited row of cans, as shown in Fig. 3. In the latter case, the cans may be arranged in rows simply by moving the discharge head laterally across the storage compartment.

Instead of delivering the cans laterally, the discharge head may be constructed in the manner of the head 286 shown in Fig. 16 to discharge the cans axially against a wall of the storage compartment or the wall formed by a previous stack of cans. In this case, the nozzle simply comprises a cylindrical tube preferably having an auxiliary outlet 288 disposed adjacent and below the can's top and opening in a direction parallel to the can axis. Air thus escapes from the outlet 288 in a stream which is directed towards a can in the next horizontal row so as to push the latter into full abutment with the face of a previously formed stack of cans or against the storage compartment wall. In such a case, slight rebounding of the cans while one row is being formed is unobjectional, because these cans will become located properly by the auxiliary air stream during the next formation of a row of horizontal cans.

Figure 2:
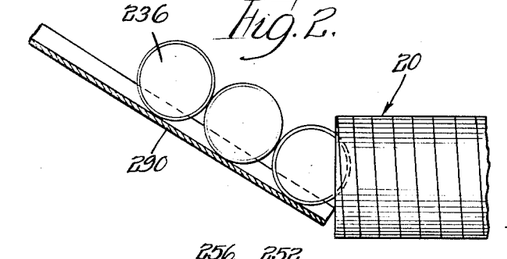
Fig. 2 is an enlarged fragmentary view showing the cans entering the inlet conduit of the apparatus of this invention.

While it is believed that the function of the above described apparatus should be clear, a brief description of the operation of the apparatus of this invention is as follows. The open end of the inlet conduit means or tube 20 is positioned in registration with the end of an inclined chute or track 290 having a supply of cans thereon, as shown in Fig. 2. The motor is then started to rotate the impellers which draw through the inlet conduit 20 to draw cans from the chute 290 through the conduit. The cans roll through the conduit 20 under the influence of the air stream passing therethrough, and their momentum and the force of the air stream causes them to enter the intermediate tube 24 by riding up on the inclined member 220, as shown in Fig. 8. The air stream by-passes the intermediate tube 24 by passing through the pervious members 220 and along the outer sides of the conduit 20 and into the inlet side of the impeller or blower housing. The air is forced through the blower housing by the impellers 92 and 100 arranged in staged relationship, as described hereinabove, and is forced into the outlet or dispensing conduit 22 at the juncture between the intermediate tube 24 and the outlet conduit. The structure previously described in effect provides a Venturi at this juncture so that considerable suction is applied at the outlet end of the intermediate tube 24 to draw cans from the tube into the outlet conduit. As the cans emerge from the intermediate tube, they roll down the inclined member into the outlet conduit, where the air stream causes them to roll through the outlet conduit. As the cans pass through the twisted or spiral section 232 of the outlet conduit, they are rotated or twisted so that their axes assume a substantially vertical position and preferably with the open ends of the cans facing upwardly. The cans then enter the turning chamber 244 and are tilted or tipped so that the air stream forces them axially into the discharge head from which they may be deposited in any desired manner.

While the apparatus disclosed herein has been described as being particularly useful for depositing cans in storage rooms or shipping containers, it is obvious that the apparatus may be equally useful for removing cans from such storage rooms or shipping containers and depositing them at any other desired point, such as guide tracks or chutes for conveying them to machinery for further processing. In addition, it is obvious that the present apparatus may be utilized for transferring articles other than cans in the manner described.

From the foregoing description, it is seen that the present invention has provided a novel apparatus fully capable of performing the objects set forth hereinabove. More specifically, it is seen that the present invention has provided a novel apparatus, whereby cans may be transferred from one point to another pneumatically, which transfer is materially assisted by arranging the cans so that they may roll through the conduit means. In addition, it is seen that the novel flexible conduit means disclosed herein enable the cans to be received or deposited at any desired point by merely bending or flexing the conduits, while at the same time guide tracks are provided for holding the cans in the desired position within the conduits and for providing air passageways to insure a continuous flow of air through the conduits. Furthermore, it is seen that the novel blower construction of this apparatus may efficiently perform its intended function and that the construction providing the Venturi action at the juncture between the intermediate tube and the outlet conduit insures the passage of cans through the intermediate tube.

While the preferred embodiments of the present invention have been shown or described herein, it is obvious that many changes may be made in the structural details of the illustrated apparatus without departing from the spirit and scope of the appended claims.

I claim:

1. In an apparatus for transferring cans or the like pneumatically, the combination comprising inlet, intermediate and outlet conduit means for receiving cans or the like transversely therein so that the cans or the like may roll therethrough, track means within each of said conduit means for maintaining the cans or the like in a transversely extending position, and means for drawing air through the inlet and intermediate conduit means and for forcing air through the outlet conduit means for rolling cans or the like through said conduit means.

2. An apparatus, as defined in claim 1, wherein said inlet and outlet conduit means have internal dimensions greater than the external dimensions of a can or the like passing therethrough to permit air to by-pass cans or the like in said last mentioned conduit means.

3. An apparatus, as defined in claim 1, wherein at least some of the track means within said inlet and outlet conduit means are spaced from the walls of said last mentioned conduit means to permit air to by-pass cans or the like in said last mentioned conduit means.

4. An apparatus, as defined in claim 1, wherein said track means are disposed along opposite sides of said conduit means for engagement with opposite ends of cans or the like.

5. An apparatus, as defined in claim 1, wherein said track means in said inlet and outlet conduit means include a relatively broad perforate element spaced from a wall of the conduit means and disposed for engagement with an end of a can or the like.

6. In an apparatus for transferring cans or the like pneumatically, intermediate conduit means for receiving cans or the like transversely disposed therein from a pneumatic inlet conduit and directing such cans or the like to a pneumatic outlet conduit, track means within said intermediate conduit means for maintaining cans or the like disposed transversely therein so that the cans or the like may roll therethrough, and restricted air duct means surrounding an outlet end of said intermediate conduit means for directing air from a blower at an increased velocity around said outlet end and into a discharge conduit for drawing air from the intermediate conduit means to insure passage of cans or the like through the intermediate conduit means and into an outlet conduit.

7. An apparatus for transferring cans or the like pneumatically, comprising an inlet conduit means, an outlet conduit means, an intermediate conduit means disposed between and having opposite ends in general alignment with ends of said inlet and outlet conduit means, track means within each of said conduit means for positioning cans or the like passing therethrough transversely thereof so that the cans or the like may roll, and air duct means surrounding an outlet end of said intermediate conduit means for directing pressurized air to said outlet conduit means and having greater internal dimensions than exterior dimensions of said intermediate conduit means at the outlet and of the intermediate conduit means so that air passing from the duct means applies a suction to the outlet end of said intermediate conduit means to insure passage of cans or the like through said intermediate conduit means.

8. In an apparatus for transferring cans and the like pneumatically, a conduit means, comprising an elongated flexible tube for receiving cans and the like transversely therein, and track means disposed longitudinally within said tube, said track means being engageable with an end of a can or the like for positioning the can transversely within the tube, and means communicating with said tube for moving air therethrough for rolling a can through the tube.

9. An apparatus, as defined in claim 8, wherein said track means is spaced from a wall of the tube to provide an air passage to allow air to by-pass cans or the like within the tube.

10. An apparatus, as defined in claim 9, wherein said track means is pervious to permit air to pass from the interior of said tube into the passage between the track means and the wall of the tube.

11. In an apparatus for transferring cans pneumatically, a conduit means including a flexible tube, and track means disposed longitudinally within said tube for engaging and positioning a can or the like passing transversely for rolling through said tube, said track means being flexible and longitudinally collapsible to permit bending of said conduit means for directing cans or the like to a desired location, and means communicating with said tube for moving air therethrough for rolling a can through the tube.

12. An apparatus, as defined in claim 11, wherein said track means comprises a flexible and longitudinally collapsible screen-like member.

13. An apparatus, as defined in claim 12, wherein said screen-like member includes a plurality of coils extending transversely to the longitudinal axis of said member, said coils having a plurality of interlocking members.

14. An apparatus, as defined in claim 12, wherein said track means includes spring means disposed longitudinally of and interconnected with said screen-like member for yieldably placing the screen-like member under tension.

15. An apparatus, as defined in claim 14, wherein said track means includes helical spring means having members thereof interconnected with loops of the coils of the screen-like member for placing the screen-like member under tension.

16. An apparatus, as defined in claim 15, wherein adjacent loops of said helical spring means are interconnected with loops of adjacent coils of said screen-like member, said helical spring means having a lead substantially equal to the width of the loops of the coils so that said helical spring means places the screen-like member under tension.

17. An apparatus for transferring cans pneumatically, comprising an inlet conduit means, a dispensing conduit means, an intermediate conduit means disposed between and having opposite ends in general alignment with said inlet and dispensing conduit means, said conduit means being adapted to receive cans or the like transversely therein so that the cans may roll therethrough, track means within each of said conduit means for positioning cans or the like transversely therein, a blower in by-pass relation to intermediate conduit means, an air duct means extending from the juncture of the inlet and intermediate conduit means to the blower and from the blower to the juncture of the intermediate and dispensing conduit means, means adjacent the outlet end of said dispensing conduit means for repositioning cans or the like so that the cans or the like are disposed with their axes extending generally longitudinally of the dispensing conduit means, and a discharge head connected with said repositioning means for axially receiving cans or the like and laterally directing the cans or the like being discharged.

18. An apparatus, as defined in claim 17, wherein said means for repositioning said cans or the like comprises abutment means engageable with an edge of one end of a can or the like so that said can or the like will turn about its transverse axis, said conduit means having an enlargement opposite said abutment means to permit turning the cans or the like engaging said abutment means.

19. An apparatus for transferring cans or the like pneumatically, comprising an inlet conduit means, a dispensing conduit means, an intermediate conduit means disposed between and having opposite ends in general alignment with ends of said inlet and dispensing conduit means, said conduit means being adapted to receive cans or the like positioned transversely thereof so that the cans or the like may roll therethrough, track means within each of said conduit means for maintaining the position of the cans or the like therein, a blower in by-pass relation to said intermediate conduit means, air duct means extending from the juncture of the inlet conduit means and the intermediate conduit means to the blower and from the blower to the juncture of the intermediate and dispensing conduit means so that air propelled by the blower is drawn through the inlet conduit means and forced through the outlet conduit means, and the track means in one of said conduit means being spirally arranged to turn the cans or the like engaged thereby to a desired position for discharge.

20. An apparatus, as defined in claim 19, wherein said spirally arranged track means are disposed in one section of said dispensing conduit means.

21. An apparatus, as defined in claim 19, wherein said dispensing conduit means includes a first section for receiving cans or the like from said intermediate conduit means with the axes of said cans or the like disposed substantially horizontally, and a second section having said spirally arranged track means disposed therein for rotating said cans or the like so that their axes extend generally vertically.

References Cited in the file of this patent
UNITED STATES PATENTS

| 1,115,193 | Hay | Oct. 27, 1914 |
| 1,211,743 | Newlon | Jan. 9, 1917 |
| 1,710,145 | Caller | Apr. 23, 1929 |
| 2,344,528 | Asbill | Mar. 21, 1944 |
| 2,457,142 | French | Dec. 28, 1948 |
| 2,543,923 | Mixwell | Mar. 6, 1951 |
| 2,624,641 | Smith | Jan. 6, 1953 |
| 2,630,350 | Berg | Mar. 5, 1953 |
| 2,643,159 | Brackett | June 23, 1953 |